April 2, 1974  T. D. McGEE  3,801,688
PROCESS FOR PRODUCING HIGH DENSITY CERAMIC PRODUCTS
Filed Dec. 22, 1971

CaO-MgO-SiO SYSTEM, EQUALIBRIUM DIAGRAM (°C)

Fe-O₂ SYSTEM EQUILIBRIUM DIAGRAM

FeO-MgO SYSTEM EQUILIBRIUM DIAGRAM

United States Patent Office 3,801,688
Patented Apr. 2, 1974

3,801,688
PROCESS FOR PRODUCING HIGH DENSITY CERAMIC PRODUCTS
Thomas D. McGee, Ames, Iowa, assignor to Iowa State University Foundation, Inc., Ames, Iowa
Continuation-in-part of abandoned application Ser. No. 882,591, Dec. 5, 1969. This application Dec. 22, 1971, Ser. No. 210,946
Int. Cl. F27b 9/04
U.S. Cl. 264—65                        10 Claims

ABSTRACT OF THE DISCLOSURE

A process for producing high density ceramic products by hot forging of the granular ceramic with a liquid phase present, and subsequently heat treating to convert the liquid phase to a solid phase sufficient to improve the hardness and strength at elevated temperatures.

RELATED APPLICATION

This application is a continuation-in-part of my earlier copending application, Ser. No. 882,591, filed Dec. 5, 1969 and now abandoned.

BACKGROUND AND SUMMARY

Ceramic materials are inorganic nonmetallic substances which are usually hard and brittle. Certain ceramics are used as abrasives and as refractories and these will be used as examples in this disclosure, but it should be understood that the process is applicable to other ceramic or partially ceramic materials.

Many applications of ceramic materials require that they be completely consolidated. The strength of ceramic materials has been shown to improve tremendously when the last few percent of pore colume is removed. The load bearing resistance of ceramic refractories at elevated temperatures is often greatly improved by reducing the porosity. The resistance of ceramic refractories to solution by corrosive slags is improved when there are fewer pores present to increase the slag penetration and to increase the reactive surface area.

Refractory ceramics made by conventional processes are made of raw plastic materials such as clays, or from grain sized aggregates such as are used to produce magnesia refractories. The conventional process constitutes forming a suitable shape, firing the shape in a kiln during which time volume shrinkage occurs, and cooling to room temperature. In this process the final finished product is invariably porous. The technology of raw material preparation, forming, and firing is highly developed but the porosity always remains—often 20 to 25% of the exterior volume of the piece. Such conventional processes and known variations thereof are illustrated by U.S. Pats. 1,300,631, 2,238,428 and 2,568,237.

Hot pressing and hot forging are known alternative processes, but their commercial use has been limited. They can be distinguished on the basis of the time of pressure application, the mechanism of consolidation, the type of mold and mold temperature. Here "mold" refers to the forming assembly or dies.

In historical metallurgy hot forging is the plastic deformation of a preheated metal blank which is rapidly transferred from the preheat furnace, struck with one die into a second die thus plastically deforming the metal to conform to the shape of the cavity in the two dies and then quickly removing the part from the dies to control cooling of said part. The dies are maintained at a much lower temperature than that of the blank and chilling of the surface of the part is minimized by the short contact time. Usually there is an attempt to control the die temperature to prevent excessive chilling of the part being hot forged. Hot forging is done with drop hammers, steam hammers, air rams or quick acting hydraulic rams. Sometimes multiple impacts will be used as in upsetting a shaft. Hence hot forging of metals is done quickly with no more than a few seconds in contact with the mold; the metal deforms throughout by plastic flow; and the mold or die is a hard, heat resistant steel alloy.

Historically, hot pressing developed for sintered carbides and similar metal-ceramic composites as a powder metallurgy technique. It was adapted to ceramic materials as essentially the same process. The material to be pressed is powdered, and pressed slowly in graphite (or occasionally sintered carbide or oxide) mold. The mold usually serves as the heating element and the temperature of the mold is the same as that of the powder being pressed. Oxidation of graphite molds is a problem and so is the reaction of the product with the molds. Such pressing produces plastic deformation of the crystalline metal, in the case of sintered carbides, or pressure enhanced diffusion in the case of ceramic materials. Pressure is applied for many minutes and sometimes for hours. Thus hot pressing is a slow pressing process in which the work and the molds are heated to the same temperature and the molds are graphite, carbides or oxides capable of withstanding the applied pressure while at extremely high temperature.

Hot forging of a ceramic material consists of compressing pre-formed blanks or loose powder in a metal mold with sufficient pressure to reduce the volume of the powder or pre-formed blank, consolidating the ceramic mass to cause an increase in strength and a reduction in porosity. The ceramic must flow during the forging process to fill the mold quickly in order to obtain the desired shape. This is possible when sufficient liquid is formed at high temperatures and the ceramic is forged quickly so that the flow is completed before the liquid freezes. Cooling caused by contact with the metal die walls will cause the liquid in contact with the die wall to freeze. The thickness of the frozen region will depend upon the thermal loss of the ceramic, its thermal diffusity, and the forging time. Rapid forging is required to produce a thin frozen layer. This layer will not flow readily and will not be as dense as the interior of the ceramic.

Hot forging of ceramic materials by plastic deformation is impractical because of their brittle nature. This invention makes it possible to hot forge with a liquid phase present. Deformation occurs by viscous flow of a liquid, not plastic flow of a crystalline metal. The crystalline ceramic particles which are surrounded by a liquid phase are not expected to deform.

The process described in this invention is a forging process when compared with hot pressing or hot forging by metallurgical or ceramic standards, and the improvement generally comprises a reduction of porosity in the final hot-forged product. The hot forging done here is done rapidly to prevent overheating the dies and mold parts and to ensure the blank does not cool and freeze the liquid before forging can be accomplished. The forging time is generally a function of the material involved and its geometry.

The amount of liquid should be as small as possible to cause the grains to flow together to consolidate the mass into a nonporous product. The amount of liquid depends upon the packing characteristics of the nonliquid portion. It must be sufficient to lubricate the grains. After the grains are consolidated and packed tightly together in contact, the liquid must fill any interstitial space. In principle, the interstitial space can be zero if the interstitial space between the coarsest particles is filled with another fraction just small enough to fit into the interstices; and a still finer fraction is used to fill the interstitial space in that fraction; and the process is continued until no pores are left. Actually, most packings have 15% interstitial space so the usual minimum amount of liquid to fill the interstitial space is 15% of the final external volume of the piece. However, if the grains deform, the liquid could be lower, about 10% by volume.

No more liquid should be added than required for pressing to minimum specific volume. Extra liquid must be converted to solid. This usually means more time in heat treating to diffuse the constituents after hot pressing. It may mean lower refractoriness for the system. Therefore, the preferred range of liquid concentration is from 10 to 30% of the external volume after pressing. However, if the grains themselves are a mixture of liquid and solid crystals and are not porous, they can deform. No interstitial liquid would be required between the grains but it should be present within the grains. This still requires the same minimum amount of liquid. But the maximum concentration could be higher—perhaps 50 or 60%. Therefore, the preferred range of liquid is 10–30% and a broader range is 10 to 60%. The optimum amount of liquid will vary from system to system but can be determined from the considerations explained above.

One should note that a very small amount of liquid, 0.5% for example, is insufficient to permit hot forging of the system where the consolidation comes about primarily by rearrangement of particles which themselves undergo little deformation. This small amount of liquid would aid hot pressing where it serves as an aid to diffusion of solid particles into a single larger body. That occurs by molecular scale mass transport and requires times for molecular scale diffusion. The forging process disclosed here, on the other hand, has rapid viscous consolidation which does require liquid flow. As explained above, much more liquid is required for hot forging but much shorter time is required.

THE DRAWINGS

In the following examples, embodiments of the method of present invention are illustrated by reference to the accompanying equilibrium diagrams, which are based on (or adapted from) similar diagrams in Phase Diagrams for Ceramists, Levin et al. (1964 ed., The American Ceramic Society):

DETAILED DESCRIPTION

This invention relates to the process of hot forging in which a granular ceramic material, such as a refractory composition is molded into a shape under heat and pressure with a liquid phase of from 10 to 60% by volume, based upon the final external volume, with one preferred embodiment comprising 10 to 30% liquid phase. As is well understood in the ceramic art, by employing a sufficiently high temperature, a liquid phase can be temporarily created from the ceramic material itself, which liquid phase will solidify or disappear on the cooling of the ceramic body. The improvement of the present invention departs sharply from the prior art in this respect.

Figure 1:
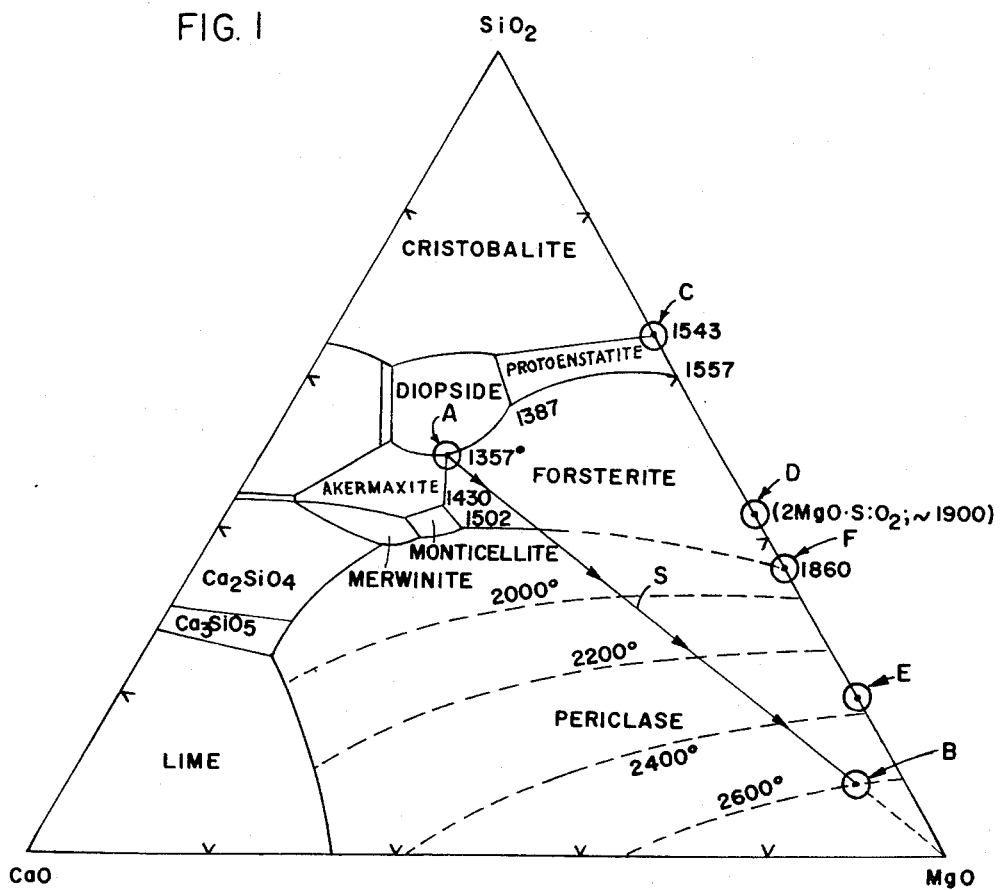
FIG. 1 is a $CaO$—$MgO$—$SiO_2$ System Equilibrium Diagram based on FIG. 598 at p. 210.
Figure 2:
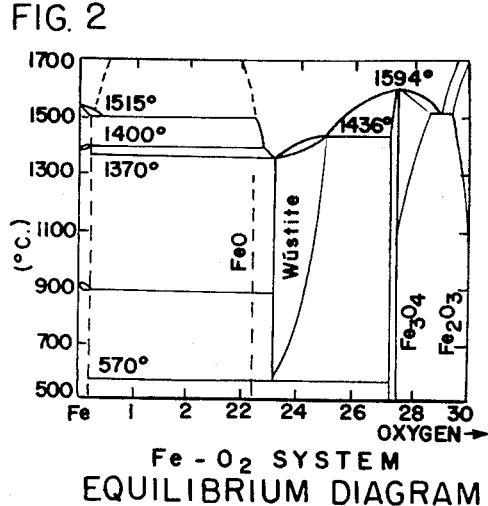
FIG. 2 is an $Fe$—$O_2$ System Equilibrium Diagram, based on FIG. 9, at p. 38.
Figure 3:
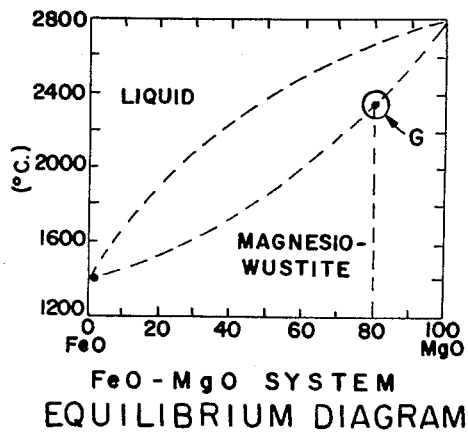
FIG. 3 is a $FeO$—$MgO$ System Equilibrium Diagram based on FIG. 63, at p. 64, of said publication.

According to the present invention, the liquid phase required for the hot forge molding operation is provided from a component of initially different composition than the ceramic material. The new component, which is preferably uniformly admixed with the ceramic material, is selected to have a melting temperature corresponding with the temperature to be used for the hot forging and lower than the melting temperature of the ceramic material. The component means in one embodiment is further characterized by being capable of reacting with the ceramic material on prolonged liquid phase contact therewith to form a substantially homogeneous refractory ceramic material of altered composition from the original ceramic material, but still having a melting temperature substantially higher than that of the component means. In carrying out the process, the molded body, after being formed by the hot forging, is held at a sufficiently high temperature for reaction with the nonliquid forming phase or with an external atmosphere until the liquid phase has substantially disappeared. As will subsequently be explained in detail, the component means can be a glass. As is well known in the ceramic art, glasses can be formed from silicon dioxide and metal oxides, such as calcium oxide or magnesium oxide, which have substantially lower melting temperatures than nonglass forms of the same components. The required ingredients and their relative proportions can be readily determined from published equilibrium system diagrams, such as the one represented by FIG. 1. Since the glass is present in a minor proportion compared to the ceramic material, prolonged heating with the glass and liquid phase will result in interaction between the components of the glass and the ceramic, producing a new homogeneous ceramic material of a nonglassy character, and having a higher melting point. It is also apparent from published equilibrium diagrams, such as those of FIGS. 2 or 3, that the liquid phase providing component means can be a mixture of ceramic metal oxides, such as refractory oxides, which will react to form the molten liquid phase at the hot forging temperature. Prolonged heating will cause the liquid phase to react with the ceramic material, and to produce a new homogeneous refractory with the substantial disappearance of the liquid phase. Also, according to well-understood principles of the ceramic art, a metal oxide can be employed to provide the liquid phase, the atmospheric or other conditions being adjusted to cause the metal oxide to melt at the hot forging temperature. On prolonged heating the metal oxide will react with the ceramic material, and form a new ceramic material of higher melting temperature than the temperature used for the hot forging.

Still another illustration of a suitable liquid phase component means is the use of a metal which is oxidizable to a refractory oxide, such as the original refractory material. The pure metal will melt readily at the forging temperature to provide the liquid phase, and thereafter the molded body can be subjected to an oxidizing atmosphere to convert the liquid metal to more refractory ceramic material, thereby causing the liquid phase to partially or completely disappear. These various procedures, all coming within the method of the present invention, are further illustrated by specific examples, set out below, but it should be understood that these examples are merely representative of numerous embodiments which can be readily developed by those skilled in the ceramic arts from published data and equilibrium phase diagrams. (See, for example, Phase Diagrams for Ceramists, Levin et al. 1964 ed., The American Ceramic Society.)

In one embodiment, the liquid phase for forging and subsequent removal is provided by incorporating a small amount of glass of such composition that it will be liquid at high temperatures so that forging is possible, followed by heat treatment to cause the glass to be removed by chemical combination with the rest of the article. This can be done where the chemical composition of the glass is chosen so that heat treatment will cause the glass to chemically combine with the rest of the object to eliminate the liquid. For example, magnesia (MgO) refractories are commonly used in steel manufacture because of their resistance to basic slags. A low melting liquid phase is undesirable because mechanical deformation will take place when heated hot enough to form the liquid. Thus, a MgO refractory containing CaO and $SiO_2$ as impurities may become weak when heated to about 1400° C. and subside under a load. This would be helpful to hot forging but would ruin the hot load properties (the strength at very high temperature). In accordance with this invention, a small amount of relatively low temperature melting glass is made. The glass contains 20% MgO, 30% CaO and 50% $SiO_2$, and is made by melting the required proportions of $MgCO_3$, $CaCO_3$ and $SiO_2$ in an alumina crucible and pouring the glass into water to quench it. This glass is a stable liquid at about 1360° C. (See point A, FIG. 1). Twenty percent of this finely ground glass is added to MgO grain obtained by crushing a high purity fired periclase brick. The mixture is tempered with about 5% water and pressed into a cube 2″ x 2″ x 2″. This cube is dried and placed in a furnace. It is heated quickly to 1370° C. to create the liquid. It is quickly transferred to a press and hot forged to reduce its volume. It is then returned to the furnace and heat treated at 1650° C. for 10 hours. The diffusion of the glass into the MgO shifted its composition along the line S toward Point B, FIG. 1, the average composition when the 20% glass and 80% MgO became completely homogeneous, eliminating the liquid below the eutectic temperature. This hot forging method produces a strong dense product, and heat treatment improves the refractoriness. For operability of the process, it is not necessary to continue the heating until all the liquid phase is removed. Usually where at least 50% (by volume or weight) of the liquid phase is eliminated, the resulting product has the desired increased hardness and increased strength.

In another embodiment, a liquid phase for hot forging and subsequent removal is provided by the incorporation of glassy or crystalline oxides, which react to form a liquid phase at hot forging temperatures and which, upon heat treatment subsequent to forging, will react with a major component to form a refractory crystalline compound, partial (at least 50%) or substantially complete elimination of the liquid phase. An illustrative example is the production of a periclase-forsterite refractory, as follows:

A mixture of 65% $SiO_2$ and 35% MgO is ball-milled ten hours. This has a melting point of 1543° C. (Point C, FIG. 1). Twenty percent of this ball-milled mixture is added to 80% dense MgO grain. This is pressed into 2″ x 2″ x 2″ cubes, dried and heated rapidly to 1600° C. The cubes are hot forged with a substantial reduction in volume indicating that the liquid phase has formed. The cubes are transferred to a furnace and heat treated at 1600° C. for 10 hours. During this time the liquid phase disappears as the reaction of the liquid with the MgO produces forsterite, $Mg_2SiO_5$, a refractory compound with a melting point of 1900° C. (Point D, FIG. 1). This refractory when it is completely homogeneous will have the composition of Point E, FIG. 1. Once the forsterite is formed no liquid will be present until 1860° C. is reached when the eutectic liquid will begin to form (Point F, FIG. 1). This is well above the operating temperature of almost all industrial furnaces.

In still another embodiment, a liquid phase for hot forging and subsequent removal is provided by combining atmospheric control during heat treatment with controlled solid solution. The liquid phase is created by incorporating a small amount of a mixture of crystalline or glassy compounds which are liquid at forging temperature, with or without atmospheric control, and which is removed (partially or completely) by heat treatment subsequent to forging to take the liquid into solid solution in a crystal structure, said heat treatment providing special atmospheric control if necessary. This is illustrated by an example in which a periclase refractory is produced, as follows: Ferric oxide has a high melting point but a reduction in oxygen pressure lowers the melting point to 1370° C. at approximately 22.7% oxygen (see FIG. 2). Twenty percent ferric oxide is added to dense MgO grain. Two inch cubes are pressed from this mixture and dried. These are heated rapidly to 1400° C. under reduced oxygen pressure to form a eutectic $FeO-Fe_2O_3$ liquid. The cubes are hot forged with about a 6% decrease in volume, indicating sufficient liquid is present to facilitate hot forging. The cubes are then heat treated at 1600° C. in a reducing atmosphere to cause FeO to form and go into solid solution in the periclase (MgO) crystal. The heating is continued until the major portion of the liquid phase disappears. This produces a strong refractory which, when completely homogeneous, contains 18% FeO and which does not develop a liquid phase until 2350° C. (Point G, FIG. 3).

In still another embodiment a liquid phase for hot forging and subsequent removal is provided by incorporation of a metal or alloy which will melt to create a liquid to facilitate hot forging followed by heat treatment to convert the metal by reaction with the atmosphere or with other constituents to form a stable compound. This is illustrated by an example using an aluminum oxide refractory as follows:

Twenty percent powdered aluminum metal is added to a grain sized aggregate of tabular alumina grain. This is heated to melt the aluminum metal, around 650° C. and hot pressed into 2″ x 2″ x 2″ cubes. The cubes can be pressed readily to a dense compact mass. The cubes are placed in a furnace and heated to 1000° C. for 24 hours in an air atmosphere. The aluminum metal is oxidized to produce a homogeneous single phase aluminum oxide product. This has a melting point of 2050° C. and is hard, strong and refractory.

It will be understood that other metals forming refractory oxides can be used instead of the aluminum, and that such metals will preferably be used in admixture with their corresponding oxides. For some purposes, part of the metal can be left unoxidized, usually not over 50%, thereby eliminating enough of the liquid phase to provide increased hardness while at the same time producing a product of improved ductility as compared with a purely refractory composition.

Another example of hot forging with a metal phase is where the mixture includes a barium oxide refractory which contains barium metal. Barium oxide melts at 2530° C. and barium metal melts at 1278° C. The barium metal will be liquid when heated above its melting point and hot forging can take place at around 1300° C. Oxidation of the barium to the oxide will leave only the refractory barium oxide present. Another such system is silicon dioxide in which silicon metal is present. The silicon dioxide can be in the crystalline form of cristobolite or tridymite. The mixture will be that of the crystalline form of dioxide plus silicon metal. Silicon metal melts at 1410° C., so hot forging could take place just above that melting point at about 1420° C. This metal can also be readily oxidized. Included in this concept are also various alloys of metals which can be used as a liquid phase and then oxidized. A suitable aluminum silicon alloy, for example, could be oxidized to an alumino silicate. Partial oxidation may sometimes be desirable.

It will be appreciated that the process of this invention can be utilized with a controlled gaseous atmosphere to achieve the stated objectives, and that ceramics other than oxides can be utilized. Moreover, in certain embodiments, the liquid phase can be eliminated without necessarily providing complete homogeneity. Thus, silicon carbide can be hot forged with metallic silicon and heated in a nitrogen atmosphere to convert the silicon to silicon nitride. The result will be a desirable hot forged product, but it will not be completely homogeneous. It will be silicon nitride bonded silicon carbide.

In my copending application Ser. Nos. 154,414, filed June 18, 1971, entitled System for Forging Hot Refractory Bodies, there is described a system and apparatus for carrying out hot forging operations. For commercial purposes, the hot forging process of this application can be practiced in conjunction with the apparatus and operating conditions set forth in said application Ser. No. 154,414. As described therein the ceramic body to be forged is heated to a state of pyroplasticity, and then quickly transported from the kiln to the mold area. The mold may be of the multipiece breakaway type having one mold piece for each side of the body. The body can then be compressed in the mold by urging all sides of the mold together simultaneously for a very brief period of time, such as 1 to 5 seconds, while cooling the mold pieces. Immediately thereafter, the mold is broken away by moving the pieces away from the ceramic body with a minimum of sliding friction. As a final step, the body can be transported to a heat treating oven for carrying out the final step for the process of this application, as described above. In specific embodiments, the block of ceramic material may have a generally rectilinear shape for engaging the surfaces of the mold pieces. By the cooling means described in the cited copending application, a temperature gradient of about 1000° C. can be maintained within five centimeters of the surface of the block, thereby protecting the mold pieces against heat damage during the compression. By using a short compressing period, such as a compressing period of less than 5 seconds, and continuing the cooling of the mold pieces, pressures of 2000 to 10,000 p.s.i. can be applied during the hot forging operation. Other details of the apparatus and system can be obtained by reference to the cited copending application.

What is claimed is:

1. A process for producing a hot forged refractory ceramic product comprising:
   (a) mixing 10 to 60% by volume of an inorganic component with 40 to 90% by volume of a granular ceramic material, said inorganic component having a melting temperature lower than the melting temperature of said ceramic material and being capable, upon prolonged liquid phase contact, of reacting with said ceramic material to form a refractory ceramic material of altered composition from the original ceramic material but having a melting temperature substantially higher than that of said inorganic component;
   (b) forming this mixture into a desired shape;
   (c) heating said shape to a temperature at or above the melting temperature of said inorganic component and below the melting temperature of said ceramic material, said heating being carried out in the absence of any mechanically applied pressure to form a liquid phase within said shape;
   (d) rapidly hot forging said liquid phase-containing shape in a mold at elevated pressures to obtain a substantial reduction in volume wherein the liquid phase present in said heated shape allows said shape to quickly flow and fill the mold before the liquid phase freezes beyond a thin-layer in contact with the mold surfaces;
   (e) transferring said hot-forged shape still containing liquid phase from said mold to a kiln maintained at a temperature above the melting temperature of said inorganic component;
   (f) heat treating said hot-forged shape to cause at least 50% of said liquid phase to combine with said ceramic material to form a refractory ceramic phase having an altered composition from the original ceramic material but having a melting temperature substantially higher than that of said inorganic component; and
   (g) cooling said heat-treated shape.

2. The process of claim 1 in which said liquid phase is present in an amount of from 10 to 30% by volume based upon the final external volume of said hot-forged shape.

3. The process of claim 1 in which said inorganic component is a glass.

4. The process of claim 1 in which said inorganic component is one or more metal oxides reacting to form said liquid phase at the hot forging temperature.

5. The process of claim 1 wherein the melting temperature of said inorganic component is affected by certain gaseous atmospheres in said heating kiln and the gaseous atmosphere in said heating kiln is controlled during heating to lower the melting temperature of said inorganic component.

6. The process of claim 5 wherein the gaseous atmosphere in said heat treating step is controlled to alter said liquid phase and obtain a solid solution combination thereof with said ceramic material.

7. A process for producing a hot-forged refractory ceramic product comprising:
   (a) mixing 10 to 60% by volume of a metal component with 40 to 90% by volume of a granular ceramic material, said metal component having a melting temperature corresponding with the temperature to be used for said hot-forging and lower than the melting temperature of said ceramic material;
   (b) forming this mixture into a desired shape;
   (c) heating said shape to a temperature at or above the melting temperature of said metal component and below the melting temperature of said ceramic material, said heating being carried out in the absence of any mechanically applied pressure to form a liquid phase within said shape;
   (d) rapidly hot forging said liquid phase-containing shape in a mold at elevated pressures to obtain a substantial reduction in volume wherein the liquid phase present in said heated shape allows said shape to quickly flow and fill the mold before the liquid phase freezes beyond a thin-layer in contact with the mold surfaces;
   (e) transferring said hot-forged shape still containing liquid phase from said mold to a heat treating kiln maintained at a temperature above the melting temperature of said metal component;
   (f) heat treating said shape in said kiln in an atmosphere containing a gas capable of reacting with said metal component to form a refractory material having a melting temperature higher than that of said kiln, said heating being continued until at least 50% of the said liquid phase reacts with said gas, whereby a refractory material having an altered composition from the original mixture and a melting temperature substantially higher than the original inorganic component is formed; and
   (g) cooling said heat-treated shape.

8. The process of claim 7 in which said liquid phase is present in an amount of from 10 to 30% by volume based upon the final external volume of said hot-forged shape.

9. The process of claim 7 in which said gas is oxygen and in which said metal forms a refractory oxide.

10. The process of claim 9 in which said metal component oxidizes to form more of said original ceramic material.

References Cited

UNITED STATES PATENTS

| 3,436,451 | 4/1969 | Wasser | 264—61 |
| 3,320,056 | 5/1967 | Stoops | 264—332 |
| 3,143,413 | 8/1964 | Krapf | 264—332 |
| 3,050,812 | 8/1962 | Felder | 264—332 |
| 3,521,326 | 7/1970 | Rice et al. | 264—332 |

(Other references on following page)

FOREIGN PATENTS 955,675   4/1964   Great Britain ........ 264—332
986,289   3/1965   Great Britain ........ 264—66

OTHER REFERENCES

N. D. Kingery (Ed.), Ceramic Fabrication Processes, 1958, John Wiley & Sons, Inc., New York, pp. 169–70.

L. A. Brissette et al., "Thermomechanically Deformed $Y_2O_3$," J.A.C.S., March, 1966, pp. 165–166.

T. D. McGee, "Constitution of Fireclays at High Temperatures: III, Deformation Characteristics," J.A.C.S., February, 1966, pp. 90–94.

R. M. Fulrath, "Hot Forming Processes," Ceramic Bulletin, December, 1964, pp. 880–885.

DONALD J. ARNOLD, Primary Examiner

U.S. Cl. X.R.

264—66, 332